(12) United States Patent
Masini

(10) Patent No.: US 12,654,427 B2
(45) Date of Patent: Jun. 16, 2026

(54) CARBON FIBER MIXED FABRIC VEHICLE HOOD AND VEHICLE SEAT COVER COMPRISING THE SAME

(71) Applicant: AUTOMOBILI LAMBORGHINI S.P.A., Sant'Agata Bolognese (IT)

(72) Inventor: Attilio Masini, Valsamoggia (IT)

(73) Assignee: AUTOMOBILI LAMBORGHINI S.P.A., Sant'agata Bolognese (IT)

( * ) Notice: Subject to any disclaimer, the term of this patent is extended or adjusted under 35 U.S.C. 154(b) by 568 days.

(21) Appl. No.: 17/908,588

(22) PCT Filed: Mar. 3, 2021

(86) PCT No.: PCT/IB2021/051751
§ 371 (c)(1),
(2) Date: Sep. 1, 2022

(87) PCT Pub. No.: WO2021/176364
PCT Pub. Date: Sep. 10, 2021

(65) Prior Publication Data
US 2023/0234340 A1    Jul. 27, 2023

(30) Foreign Application Priority Data
Mar. 3, 2020    (IT) ........................ 102020000004405

(51) Int. Cl.
| | |
|---|---|
| *B32B 25/08* | (2006.01) |
| *B32B 3/04* | (2006.01) |
| *B32B 3/26* | (2006.01) |
| *B32B 5/02* | (2006.01) |
| *B32B 7/12* | (2006.01) |
| *B32B 25/18* | (2006.01) |
| *D03D 15/275* | (2021.01) |
| *D03D 15/283* | (2021.01) |
| *D06M 15/00* | (2006.01) |

(52) U.S. Cl.
CPC ................ *B32B 25/08* (2013.01); *B32B 3/04* (2013.01); *B32B 3/266* (2013.01); *B32B 5/024* (2013.01);
(Continued)

(58) Field of Classification Search
None
See application file for complete search history.

(56) References Cited

U.S. PATENT DOCUMENTS

| | | | |
|---|---|---|---|
| 4,405,669 A | 9/1983 | Pott | |
| 7,351,672 B2 * | 4/2008 | Johnson ................ | D03D 15/49 |
| | | | 296/136.11 |

(Continued)

FOREIGN PATENT DOCUMENTS

| | | |
|---|---|---|
| CN | 208359812 U | 1/2019 |
| DE | 202005005815 U1 | 9/2005 |

(Continued)

OTHER PUBLICATIONS

English translation of Kiuchi et al. (JP 2005-179845). (Year: 2005).*

(Continued)

*Primary Examiner* — Ronak C Patel
(74) *Attorney, Agent, or Firm* — SHUTTLEWORTH & INGERSOLL, PLC; Timothy J. Klima

(57) ABSTRACT

A vehicle hood includes at least one rubber layer and an outer layer positioned to face towards an exterior of the vehicle and applied on an outer side of the at least one rubber layer. The outer layer includes a fabric including carbon fiber yarns and polymer fiber yarns woven to form an interlacement and a protective layer applied on the interlacement including a polymer-based solvent. The fabric subjected to traction is elongated by at least 2% and up to 5% and exceeds more than 25,000 working cycles of bending strength according to a Bally test. The protective layer confers a water impermeability of 2000 mm water column at 2 bar and confers scratch resistance of at least 20,000 working cycles.

29 Claims, 7 Drawing Sheets

(52) U.S. Cl.
CPC ................ *B32B 7/12* (2013.01); *B32B 25/18* (2013.01); *D03D 15/275* (2021.01); *D03D 15/283* (2021.01); *D06M 15/00* (2013.01); *B32B 2250/02* (2013.01); *B32B 2250/24* (2013.01); *B32B 2262/0253* (2013.01); *B32B 2262/0269* (2013.01); *B32B 2262/0276* (2013.01); *B32B 2262/106* (2013.01); *B32B 2262/148* (2021.05); *B32B 2305/188* (2013.01); *B32B 2601/00* (2013.01); *B32B 2605/00* (2013.01)

(56) References Cited

U.S. PATENT DOCUMENTS

| | | |
|---|---|---|
| 2003/0057740 A1 | 3/2003 | Schmitt et al. |
| 2005/0164578 A1 | 7/2005 | LoFaro et al. |

FOREIGN PATENT DOCUMENTS

| | | | |
|---|---|---|---|
| DE | 102008064006 A1 | 10/2009 |
| EP | 2636776 A1 | 9/2013 |
| JP | 2003096643 A1 | 4/2003 |
| JP | 2005179845 A | 7/2005 |
| WO | 9936607 A1 | 7/1999 |
| WO | 2009053121 A1 | 4/2009 |

OTHER PUBLICATIONS

English translation of Murotani et al. (JP 2019-014997). (Year: 2019).*

English translation of Lee (KR 2013-046530). (Year: 2013).*

International Search Report and Written Opinion dated Jun. 17, 2021 from counterpart International Patent Application No. PCT/IB2021/051751.

Japanese Office Action dated Jan. 21, 2025 from counterpart Japanese App No. 2022-552565.

* cited by examiner

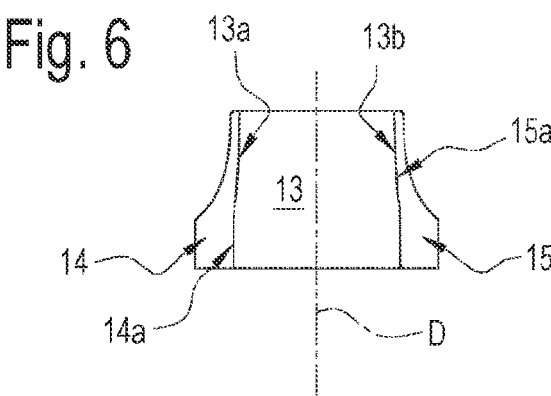
Fig. 6
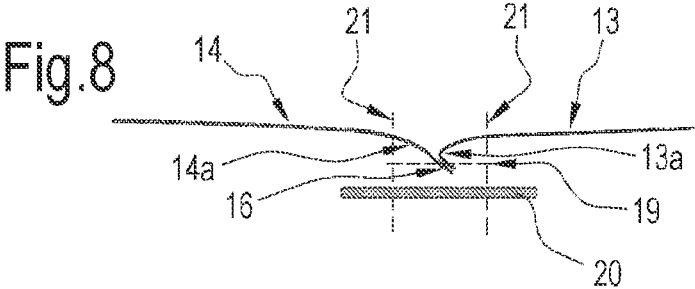
Fig. 7
Fig. 8
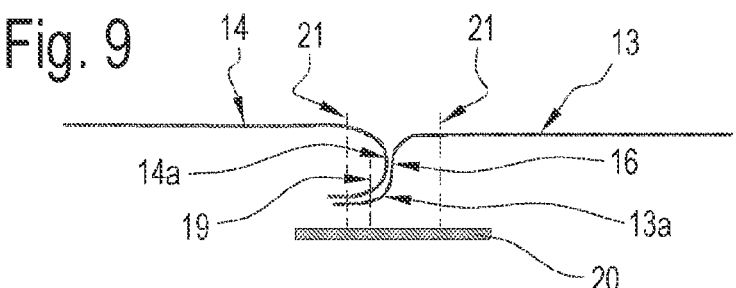
Fig. 9

CARBON FIBER MIXED FABRIC VEHICLE HOOD AND VEHICLE SEAT COVER COMPRISING THE SAME

This application is the National Phase of International Application PCT/IB2021/051751 filed Mar. 3, 2021 which designated the U.S.

This application claims priority to Italian Patent Application No. 102020000004405 filed Mar. 3, 2020, which application is incorporated by reference herein.

TECHNICAL FIELD

This invention relates to a fabric comprising carbon fibre, or carbon fibre fabric.

BACKGROUND ART

Known in the prior art are fabrics comprising carbon fibre warp and weft yarns.

AIM OF THE INVENTION

To meet the need for a fabric comprising carbon fibre and capable of elongation by at least 2-3% compared to prior art carbon fibre fabrics, when subjected to traction, the Applicant has developed a fabric comprising carbon fibre with an interlacement of carbon fibre yarns and polymer fibre yarns.

Advantageously, the polymer fibre yarns, woven with the carbon fibre yarns give the fabric the required elongation capability.

BRIEF DESCRIPTION OF THE DRAWINGS

Further features and advantages of this solution are more apparent in the exemplary, hence non-limiting description below, with reference to a preferred embodiment of a carbon fibre fabric as illustrated in the accompanying drawings, in which:

FIG. 6 schematically illustrates the hood of FIG. 5;

FIG. 7 is a scaled-up detail of a first variant embodiment of the hood of FIG. 5;

FIG. 8 is a scaled-up detail of a second variant embodiment of the hood of FIG. 5;

FIG. 9 is a scaled-up detail of a third variant embodiment of the hood of FIG. 5;

DETAILED DESCRIPTION OF PREFERRED EMBODIMENTS OF THE INVENTION

Figure 1:
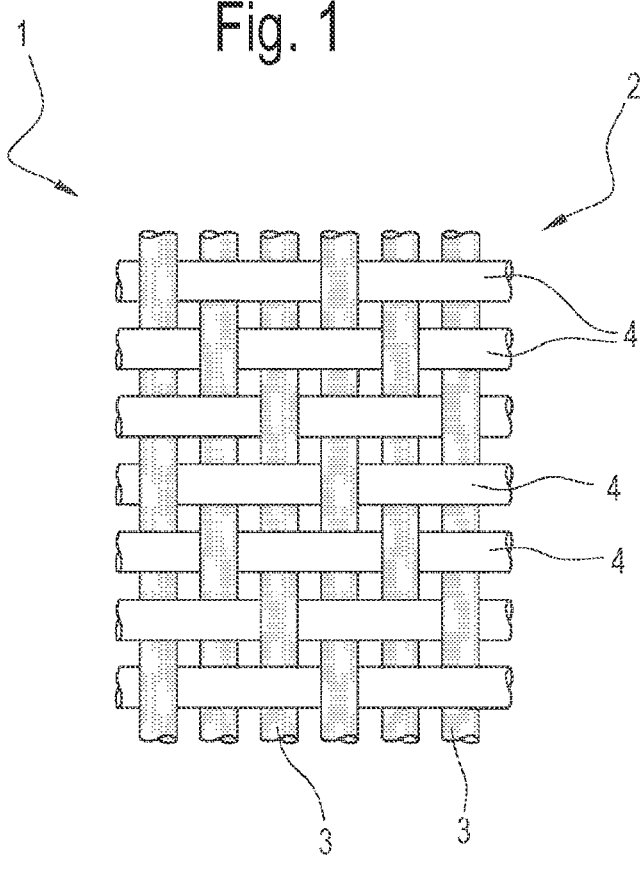
FIG. 1 is a schematic view of a portion of carbon fibre fabric according to this description.

The reference numeral 1 denotes a fabric according to this description.

The fabric 1 comprises carbon fibre yarns 3 and polymer fibre yarns 4 woven to form an interlacement 2.

In other words, the fabric 1 has an interlacement 2 of carbon fibre yarns 3 and polymer fibre yarns 4.

The carbon fibre yarns 3 have a linear density of between 50 and 5000 g/km, comprising from 1000 to 60000 filaments, specifically from 3000 to 24000 filaments between 5 and 10 microns in diameter.

More specifically, the interlacement 2 comprises a weft f carbon fibre yarns 3 and a warp of polymer fibre yarns 4.

Preferably, with reference to the carbon fibre yarn 3 of the interlacement 2, the number of filaments per yarn is between 1K and 60K, inclusive, in particular, between 3K and 12K, inclusive.

In an alternative embodiment, the interlacement 2 comprises a weft of polymer fibre yarns 4 and a warp of carbon fibre yarns 3.

Advantageously, the polymer fibre yarns 4, woven with the carbon fibre yarns give the fabric 1 an elastic elongation capability at least along the predominant direction of extension of the yarns 4 themselves in the fabric 1.

When the polymer fibre yarns 4 constitute the warp of the fabric 1, the fabric 1 is elastically elongatable along the warp.

When the polymer fibre yarns 4 constitute the weft of the fabric 1, the fabric 1 is elastically elongatable along the weft.

The elongation of the fabric 1 is greater along the direction of the polymer fibre yarns 4 than the elongation of the fabric 1 along the direction of the carbon fibre yarns 3.

In an embodiment, the fabric 1, if subjected to traction, is elongated by up to 5% and at least by 2% or 3%.

In an embodiment, the polymer fibre yarns 4 are polyester yarns.

Alternatively, the polymer fibre yarns 4 are polypropylene yarns.

In yet another embodiment, the polymer fibre yarns 4 are aramid fibre yarns.

The use of polymer fibre yarns 4 woven with the carb n fibre yarns 3 allows making a "hybrid" interlacement 2 which can respond to traction loads by elongation in particular along a direction of application of the load.

Preferably, the interlacement 2 is a "twill" interlacement 2, specifically "twill 2/1".

Figure 2:
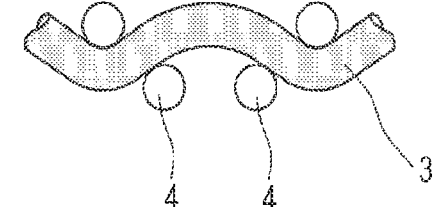
FIG. 2 is a schematic cross sectional view of the fabric of FIG. 1.
Figure 3:
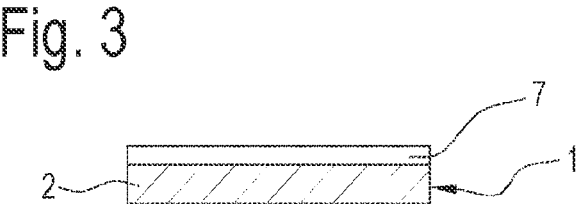
FIG. 3 is another schematic cross sectional view of the portion of FIG. 1.

Preferably, the interlacement 2 comprises a pair of warp yarns 4 of polymer fibre woven with a single yarn 3 of carbon fibre (see FIG. 2).

As regards bending strength according to the Bally test, mechanical laboratory tests have shown that the fabric 1 according to this description is able to exceed more than 25,000 working cycles, compared to the 5,000 working cycles of prior art carbon fibre fabrics.

In a preferred embodiment, the fabric 1 comprises a protective layer 7 applied on the interlacement 2, specifically to make the fabric 1 water repellent.

More specifically, the protective layer 7 comprises a polyp-er-based solvent.

The protective layer 7 confers a water impermeability of 2000 mm water column at 2 bar.

The protective layer 7 confers scratch resistance of a least 20,000 working cycles.

The protective layer 7 is disposed at least along one of the surfaces of extension of the interlacement 2, preferably a surface which, in conditions of use, is exposed towards the outside atmosphere.

With reference to its elongation properties, the fabric 1 may be used in numerous technical fields requiring the light weight and mechanical strength of the carbon fibre combined with the capability of elongation by traction.

For example, an awning for nautical use, not illustrated, ay comprise a fabric 1 according to this description.

Figure 4:
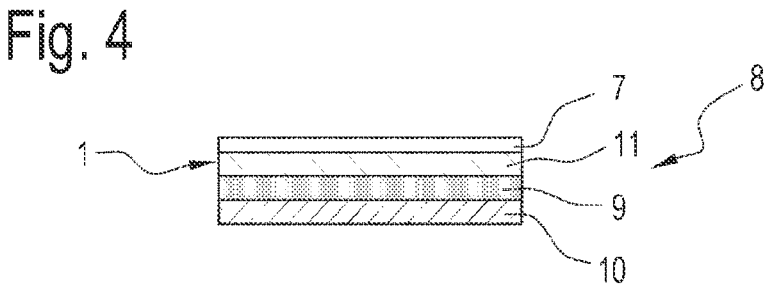
FIG. 4 is a schematic cross sectional view of a portion of a vehicle hood made from the carbon fibre fabric according to this description.
Figure 5:
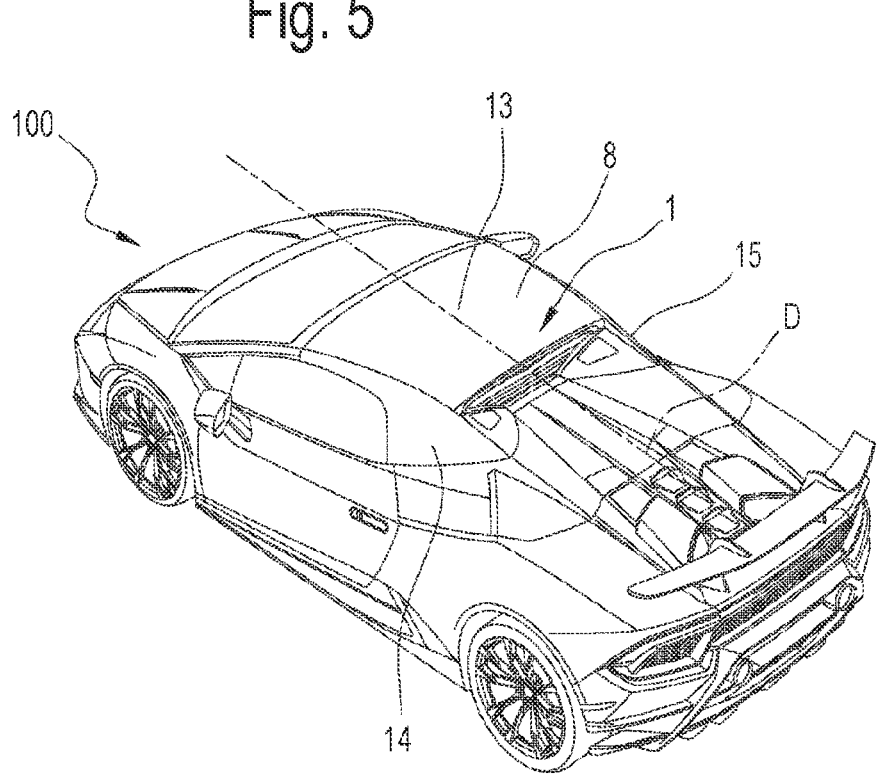
FIG. 5 is a schematic perspective view of a vehicle comprising the hood made from the carbon fibre fabric according to this description.
Figures 10, 11:
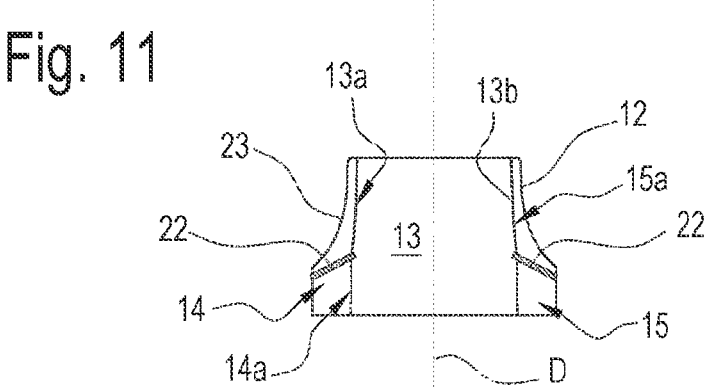
FIG. 10 is a scaled-up detail of a fourth variant embodiment of the hood of FIG. 5.
FIG. 11 is a variant of the hood of FIG. 6.

In this context, with reference in particular to FIGS. 4 and 5, a hood 8 for a vehicle 100 having a predominant direction of extension D is illustrated.

The hood or roof 8 is of a folding type and the vehicle 100 is a convertible with a folding roof that is movable between an open configuration, illustrated in FIG. 5, where the interior of the vehicle 100 is covered, and a closed or folded configuration, where the interior of the vehicle 100 is uncovered.

The hood 8 comprises at least one rubber layer 9, preferably a layer 9 of butyl rubber, interposed between at least one first layer or inner lay r 10, intended to face towards the inside of the vehicle 100, and a second layer or outer layer 11, intended to face towards the outside of the vehicle 100.

The outer layer 11 comprises the fabric 1, preferably coated with the protective layer 7.

The first layer 10 of the hood 8 is, for example, made of synthetic material, preferably acrylic material.

In order to test the elongation of the fabric 1, a tensile test to DIN EN 13934-1 was carried out.

The test pieces for the tensile test included a warp of car on fibre yarns 3 and a weft of polymer fibre yarns 4, specifically polyester.

Figure 18:
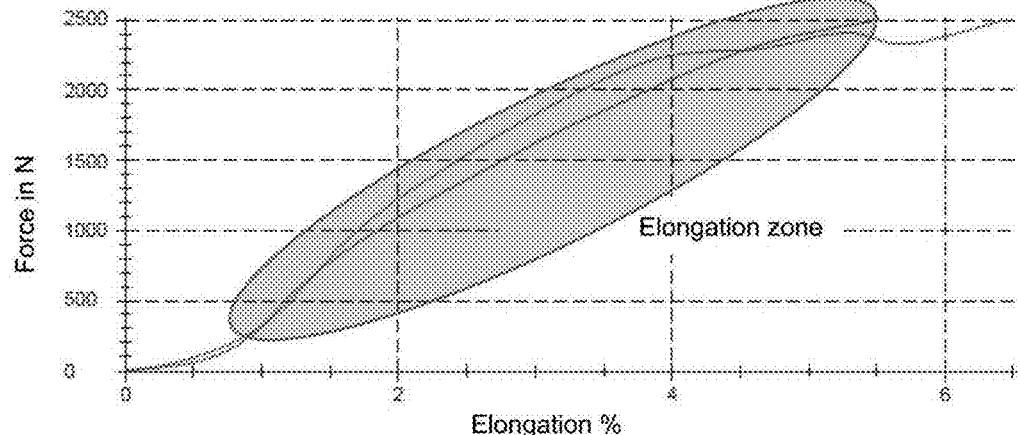
FIG. 18 shows a graph of a test.

The graph in FIG. 18 shows the result of the test.

The fabric 1 elongates by up to 5% and by at least 2% and 3%.

With reference to FIG. 6, it may be observed that the hood 8 preferably and schematically comprises a main portion 13, intended to at least partly define a top or roof of the vehicle 100, and at least a first side portion 14 and a second side portion 15, each defining at least part of a respective flank of the vehicle 100.

The first and second side portions 14, 15 are disposed on opposite sides of the main portion 13 along the second direction D.

The first and second side portions 14, 15 each have a respective outer perimeter edge 23, 24, intended to come into contact with the body of the vehicle 100 when the hood 8 is in the closed condition.

More specifically, the first side portion 14 and the main portion 13 are joined along respective inner perimeter edges 14a and 13a, preferably by seam stitches which, for example, allow better folding of the hood 8.

The second side portion 15 and the main portion 13 are Joined along respective inner perimeter edges 15a and 13b, preferably by seam stitches.

The main portion 13 has a first inner perimeter edge 13a and a second inner perimeter edge 13b.

In a first embodiment, illustrated in FIG. 7, the inner perimeter edge 14a of the first side portion 14 and the first inner perimeter edge 13a of the main portion 13 are joined in such a way that one face of the inner perimeter edge 14E of the first side portion 14 abuts against one face of the first inner perimeter edge 13a of the main portion 13 to define a crest 16 extending along the length of the edges 13a, 14a.

This feature also applies to the inner perimeter edge 15a of the second side portion 15 and the second inner perimeter edge 13b of the main portion 13.

In a second variant embodiment, a first seam 19 joins the face of the inner perimeter edge 14a of the first side portion 14 to the face of the fir t inner perimeter edge 13a of the main portion 13 (FIG. 8).

This feature also applies to the inner perimeter edge 15a of the second side portion 15 and the second inner perimeter edge 13b of the main portion 13.

The first seam 19 is transverse to the longitudinal direction of extension of the crest 16.

In a third, alternative variant embodiment (FIG. 9), the crest 16 provided with the first seam 19 is folded onto part of the main portion 13 or onto part of one between the first side portion 14 and the second side portion 15.

These variants optionally comprise a layer of adhesive material 20 placed at least on the crest 16 in order to hide it.

These variants also optionally comprise at least a second seam 21 joining a portion of the layer of adhesive material 20 to the main portion 13.

The second seam 21 runs parallel to a respective inner edge 13a, 13b, the first inner perimeter edge 13a and the second inner perimeter edge 3b of the main portion 13.

A further option is a second seam 21 joining a respective portion of the layer of adhesive material 20 to the first side portion 14.

The second seam 21 runs parallel to a respective perimeter edge 14a of the first side portion 14.

A further option is a second seam 21 joining a respective portion of the layer of adhesive material 20 to the second side portion 15.

The second seam 21 runs parallel to a respective perimeter edge 15a of the second side portion 15.

In a fourth embodiment, illustrated in FIG. 8, a flap 17 of the inner perimeter edge 14a of the first side portion 14 is connected, preferably by seams, to a flap 18 of the first inner perimeter edge 13a of the main portion 13 in such a way that the main portion 13 and the first side portion 14 overlap at least at the respective flaps 18, 17 which are placed on top of one another.

This feature also applies to the inner perimeter edge 15a of the second side portion 15 and the second inner perimeter edge 13b of the main portion 13.

According to this description, the main portion 13 of the hood 8 comprises the fabric 1, or at least the main portion 13 is preferably made from the fabric 1.

Advantageously, that way, the hood 8, at least at the main portion 13, has all the properties of the fabric 1, including the elastic properties.

The first side portion 14 and the second side portion 15 each comprise a respective elasticized element 22.

Advantageously, each elasticized element 22 ensures a desired folding direction during the opening/closing of the first side portion 14 and second side portion 15 of the hood 8, thus preventing the main portion 13 from folding.

In effect, it has been found that folding the main portion 13 when the hood 8 is opened or closed leads to the formation of creases where the structure of the fabric 1 eventually wears down.

With reference to the first side portion 14, the elasticized Element 22 is disposed between the outer perimeter edge 23 and the inner perimeter edge 14*a*.

Preferably, the elasticized element 22 extends from the outer perimeter edge 23 to the inner perimeter edge 14*a*.

With reference to the second side portion 15, the elasticized element 22 is disposed between the outer perimeter edge 24 and the inner perimeter edge 15*a*.

Preferably, the elasticized element 22 extends from the outer perimeter edge 24 to the inner perimeter edge 15*a*.

The elasticized element 22 is inclined to the direction of extension of the outer perimeter edge 23 and to the direction of extension of the inner perimeter edge 14*a* of the first side portion 14.

The elasticized element 22 is inclined to the direction of extension of the outer perimeter edge 24 and to the direction of extension of the inner perimeter edge 15*a* of the second side portion 15.

The elasticized element 22 of the first side portion 14 and of the second side portion 15 are disposed relative to each other in such a way that their directions of extension are convergent.

These properties allow the hood 8 to pass from the closed or folded configuration to the open configuration since the open configuration usually r quires the hood to be elongated to an extent not normally obtainable with fabrics comprising both warp and weft yarns made from carbon fibre.

Figure 12:
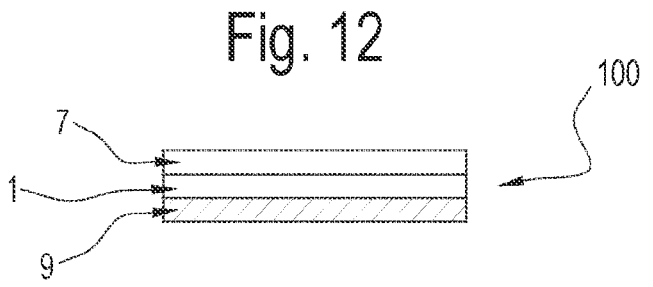
FIG. 12 is a schematic cross sectional view of a portion of a vehicle seat upholstery cover made from the carbon fibre fabric according to this description.

FIG. 12 shows a schematic cross sectional view of a detail of an upholstery cover 100 for rigid or semi-rigid elements.

The cover 100 comprises a layer of the fabric 1 applied on a layer of rubber 9, preferably butyl rubber.

The layer of rubber 9 has a thickness less than or equal to 0.5 mm.

The layer of fabric 1 and the layer of rubber 9 have respective through holes.

Figure 13:
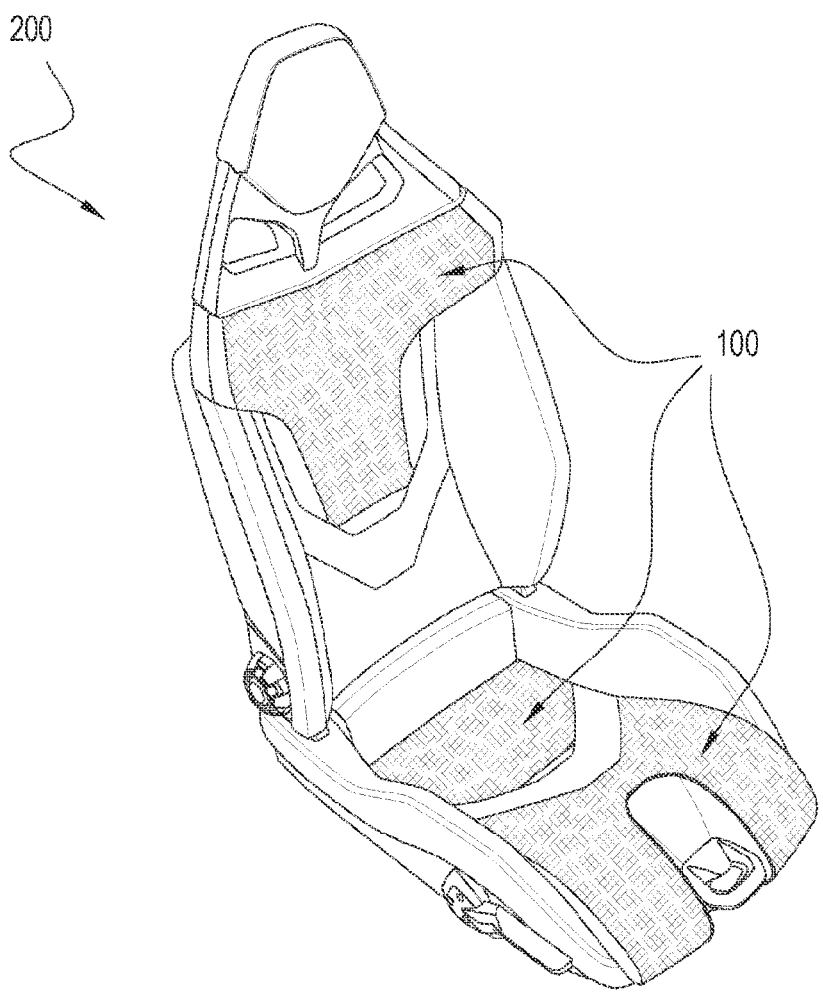
FIG. 13 is a schematic perspective view of a vehicle seat comprising the upholstery cover made from the carbon fibre fabric according to this description.

FIG. 13 in particular illustrates a seat 200 for vehicles, specifically automobiles, at least partly comprising the cover 100.

The seat 200 comprises portions of the cover 100 stitched together as illustrated in FIGS. 14 to 17.

Figure 14:
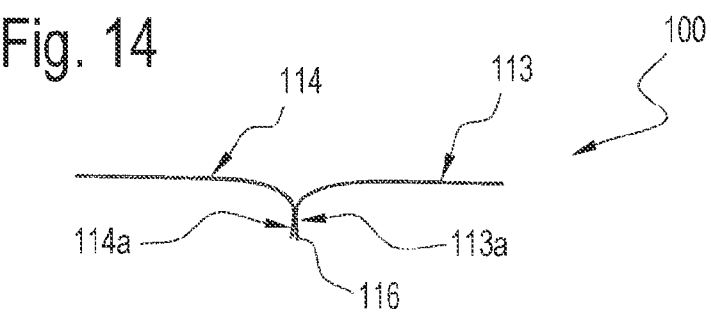
FIG. 14 is a scaled-up detail of a first variant embodiment of the seat of FIG. 13.

With reference to FIG. 14, the seat 200 comprises a fir t inner perimeter edge 114*a* of a first portion 114 of the cover 100 and a second inner perimeter edge 113*a* of a second portion 113 of the cover 100 which are joined together in such a way as to form a crest 116 extending along the length of the inner perimeter edges 113*a*, 114*a*.

Figure 15:
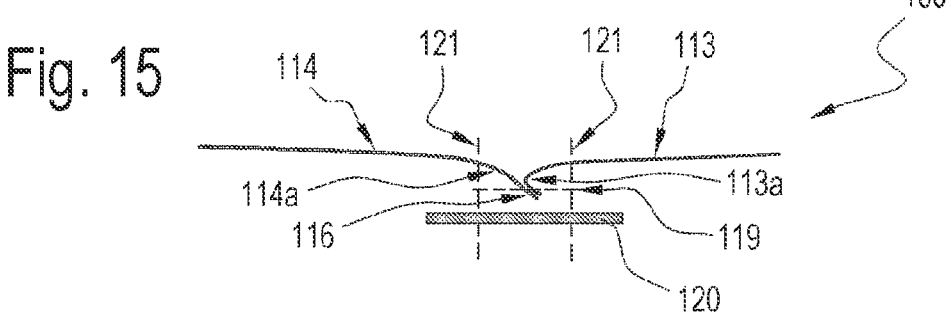
FIG. 15 is a scaled-up detail of a second variant embodiment of the seat of FIG. 13.

With reference to FIG. 15, a first seam 119 joins the face of the inner perimeter edge 114*a* to the face of the second inner perimeter edge 113*a*.

The crest 116 provided with the first seam 119 is folded onto part of the first portion 113 or onto part of the second portion 114.

A layer of adhesive material 120 is placed at least on the crest 116 in order to hide it.

Figure 16:
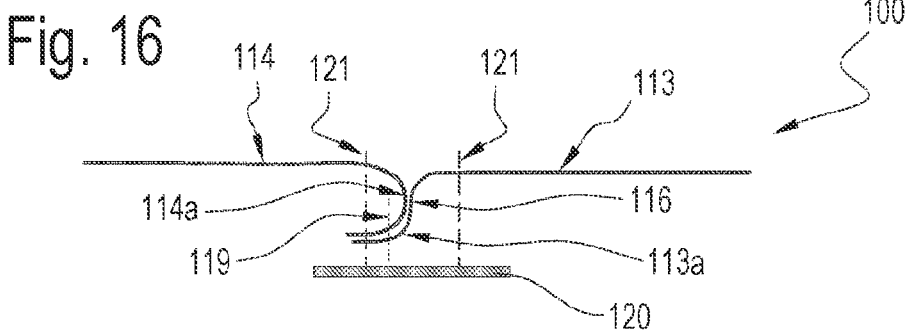
FIG. 16 is a scaled-up detail of a third variant embodiment of the seat of FIG. 13.

With reference to FIG. 16, at least a second seam 121 joins a portion of the layer of adhesive material 120 to the first portion 113.

A second seam 121 joins a respective portion of the layer of adhesive material 20 to the second portion 114.

Figure 17:
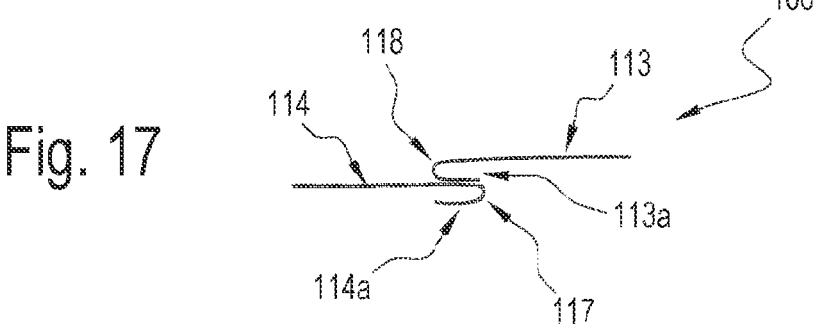
FIG. 17 is a scaled-up detail of a fourth variant embodiment of the seat of FIG. 13.

With reference to FIG. 17, a flap 117 of the inner perimeter edge 114*a* of the first portion 114 is connected, preferably by seams, to a flap 118 of the first inner perimeter edge 113*a* of the second portion 113 in such a way that the first portion 113 and the C second portion 114 overlap at least at the respective flaps 117, 118.

The invention claimed is:

1. A vehicle hood comprising:
   at least one rubber layer, and
   an outer layer positioned to face towards an exterior of the vehicle and applied on an outer side of the at least one rubber layer, wherein the outer layer comprises a fabric comprising:
   carbon fiber yarns and polymer fiber yarns woven to form an interlacement;
   a protective layer applied on the interlacement comprising a polymer-based solvent;
   wherein the fabric subjected to traction is elongated by at least 2% and up to 5%;
   wherein the fabric exceeds more than 25,000 working cycles of bending strength according to a Bally test;
   wherein the protective layer confers a water impermeability of 2000 mm water column at 2 bar;
   wherein the protective layer confers scratch resistance of at least 20,000 working cycles.

2. The vehicle hood according to claim 1, wherein the interlacement comprises a weft of carbon fiber yarns and a warp of polymer fiber yarns.

3. The vehicle hood according to claim 1, wherein the interlacement comprises a weft of polymer fiber yarns and a warp of carbon fiber yarns.

4. The vehicle hood according to claim 1, wherein the polymer fiber yarns comprise polyester yarns.

5. The vehicle hood according to claim 1, wherein the polymer fiber yarns comprise polypropylene yarns.

6. The vehicle hood according to claim 1, wherein the polymer fiber yarns comprise aramid fiber yarns.

7. The vehicle hood according to claim 1, wherein the number of filaments of the carbon fiber yarns is between 1,000 and 60,000.

8. The vehicle hood according to claim 7, wherein the number of filaments of the carbon fiber yarns is between 3,000 and 12,000.

9. The vehicle hood according to claim 1, wherein the interlacement is a twill interlacement.

10. The vehicle hood according to claim 9, wherein the interlacement is a twill 2/1 interlacement.

11. The vehicle hood according to claim 1, wherein the interlacement comprises a pair of polymer fiber weft yarns and a single carbon fiber warp yarn.

12. The vehicle hood according to claim 1, further comprising an inner layer positioned to face towards an interior of the vehicle and applied on the at least one rubber layer on an inner side of the at least one rubber layer opposite to the outer layer.

13. The vehicle hood according to claim 12, wherein the inner layer is made of synthetic material.

14. The vehicle hood according to claim 13, wherein the inner layer is made of acrylic material.

15. The vehicle hood according to claim 1, wherein the hood comprises a main portion, defining at least a vehicle top or roof, and at least a first side portion and a second side portion, each defining at least part of a respective flank of the vehicle; at least the main panel comprising the fabric.

16. The vehicle hood according to claim 15, wherein an inner perimeter edge of the first side portion and an inner perimeter edge of the second side portion are connected to a respective first inner perimeter edge and second inner perimeter edge of the main portion to define a crest extending along a length of the inner perimeter edges.

17. The vehicle hood according to claim 16, wherein a first seam joins a face of the inner perimeter edge of the first side portion to a face of the first inner perimeter edge of the main portion.

18. The vehicle hood according to claim 17, wherein the crest provided with the first seam is folded onto part of the main portion or onto part of one between the first side portion and the second side portion.

19. The vehicle hood according to claim 16, wherein a first seam joins the inner perimeter edge of the second side portion to the second inner perimeter edge of the main portion.

20. The vehicle hood according to claim 19, wherein the crest provided with the first seam is folded onto part of the main portion or onto part of one between the first side portion and the second side portion.

21. The vehicle hood according to claim 16, wherein a layer of adhesive material is placed at least on the crest to hide the crest.

22. The vehicle hood according to claim 21, further comprising at least a second seam joining a portion of the layer of adhesive material to the main portion.

23. The vehicle hood according to claim 21, further comprising at least a second seam joining a respective portion of the layer of adhesive material to the first side portion.

24. The vehicle hood according to claim 21, further comprising a second seam joining a respective portion of the layer of adhesive material to the second side portion.

25. The vehicle hood according to claim 16, wherein a flap of the inner perimeter edge of the first side portion is connected to a flap of the first inner edge of the main portion such that the main portion and the first side portion overlap at least at the respective flaps.

26. The vehicle hood according to claim 25, wherein the flap of the inner perimeter edge of the first side portion is connected by seams to the flap of the first inner edge of the main portion.

27. The vehicle hood according to claim 15, wherein the first side portion and the second side portion each comprise a respective elasticized element; the elasticized element being disposed between an outer perimeter edge and the inner perimeter edge of the first side portion; the elasticized element being disposed between an outer perimeter edge and the inner perimeter edge of the second side portion.

28. The vehicle hood according to claim 1, wherein the fabric subjected to traction is elongated by at least by 3%.

29. The vehicle hood according to claim 1, wherein the at least one rubber layer is made of butyl rubber.

* * * * *